United States Patent [19]

Vouk et al.

[11] Patent Number: 4,674,349
[45] Date of Patent: Jun. 23, 1987

[54] LOCKING MECHANISM

[75] Inventors: Kenneth L. Vouk, Willowick, Ohio; Kelly White, Greenwood, S.C.

[73] Assignee: The Babcock & Wilcox Company, New Orleans, La.

[21] Appl. No.: 682,973

[22] Filed: Dec. 18, 1984

Related U.S. Application Data

[63] Continuation-in-part of Ser. No. 359,966, Mar. 19, 1982, abandoned.

[51] Int. Cl.[4] .............................................. F16H 25/24
[52] U.S. Cl. .................................. 74/424.8 A; 74/625; 403/104; 403/374
[58] Field of Search ................ 74/424.8 A, 424.8 VA, 74/625; 269/173, 174, 175, 176, 177, 178; 403/104, 374

[56] References Cited

U.S. PATENT DOCUMENTS

| 357,567 | 2/1887 | Barnes | 74/424.8 A |
|---|---|---|---|
| 412,166 | 10/1889 | Dawson | 269/173 |
| 493,364 | 3/1893 | Lewis | 269/173 |
| 521,698 | 6/1894 | Boegen | 269/173 |
| 1,453,207 | 4/1923 | Sury | 269/175 |
| 1,467,039 | 9/1923 | Hume | 74/424.8 A |
| 1,721,227 | 7/1929 | Manley | 74/424.8 A |
| 2,463,263 | 3/1949 | Gordon | 74/424.8 A |
| 2,491,543 | 12/1949 | Alfonso | 74/424.8 A |
| 2,705,983 | 4/1955 | Guadagna | 269/174 |
| 3,162,073 | 12/1964 | Farckas | 74/424.8 A |
| 3,188,897 | 6/1965 | De Valliere | 74/424.8 A |
| 3,677,108 | 7/1972 | Prikryl et al. | 74/625 |
| 3,730,008 | 5/1973 | Sheesley | 74/89.15 |
| 3,842,690 | 10/1974 | Gulick | 74/625 |
| 3,961,547 | 6/1976 | Shainberg et al. | 83/11 |
| 3,992,821 | 11/1976 | Hoffman | 51/125 |

FOREIGN PATENT DOCUMENTS

| 207564 | 12/1983 | Japan. | |
| 973387 | 10/1964 | United Kingdom | 269/173 |

*Primary Examiner*—Allan D. Herrmann
*Attorney, Agent, or Firm*—Vytas R. Matas; Robert J. Edwards

[57] ABSTRACT

A mechanism (10) engageable with a threaded shaft (12) which includes a pair of nut halves (16,18) movable into and out of engagement with the shaft (12). The nut halves (16,18) are received within spaced frame plates (32,34) with one nut half (16) attached to the plates (32,34) and the other nut half (18) slidable between the plates (32,34). An elliptical cam member (44) received between the slidable nut half (18) and an end plate (36) connecting the frame plates (32,34) is operable to move the nut halves (16,18) between their engaged and disengaged positions.

8 Claims, 4 Drawing Figures

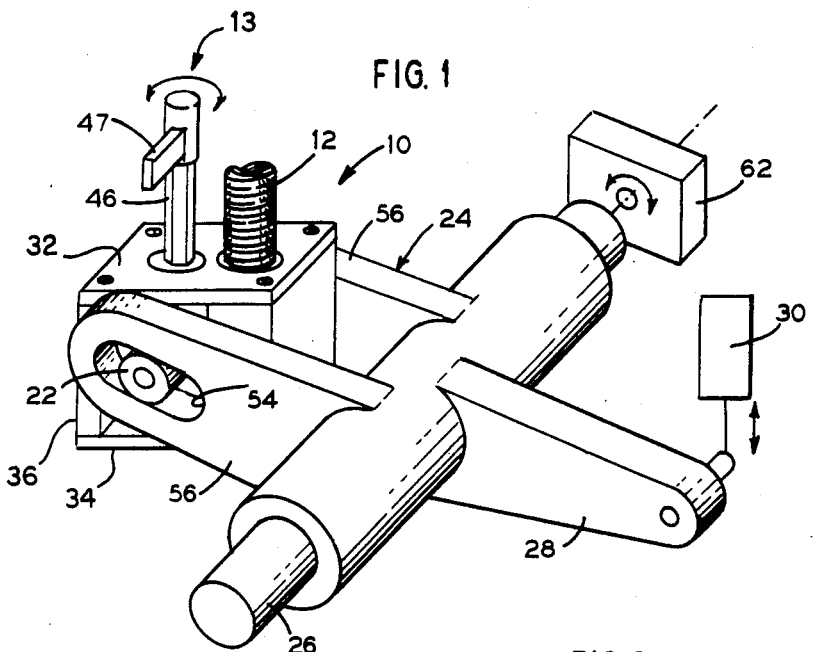
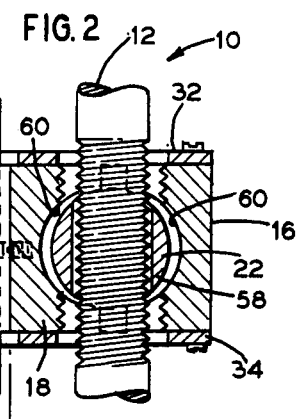
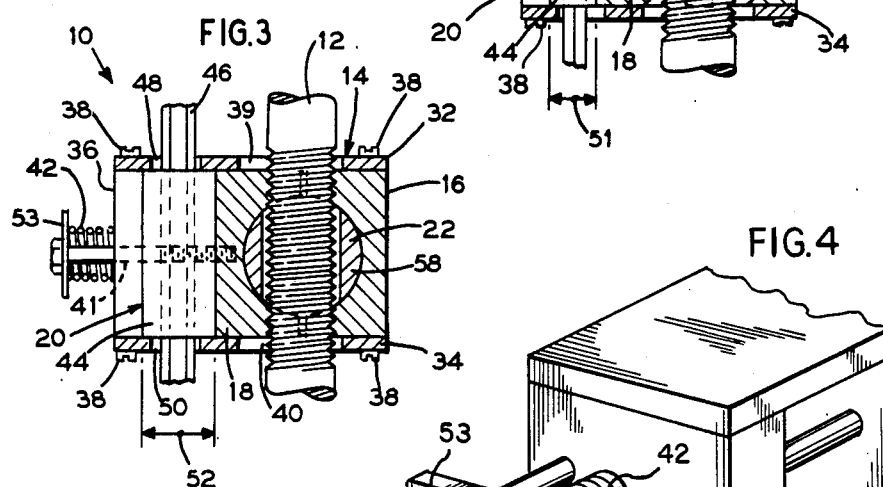
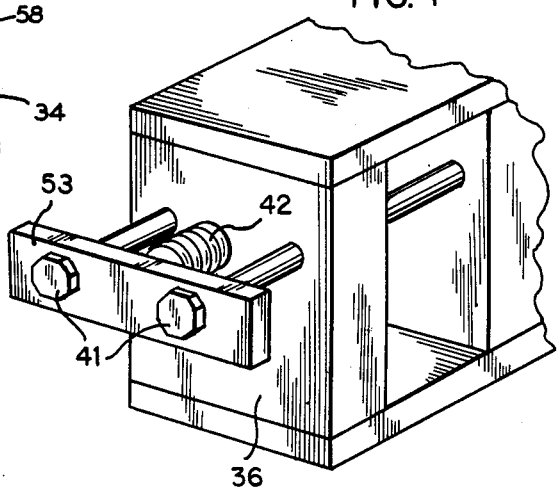

LOCKING MECHANISM

This is a continuation-in-part of application Ser. No. 359,966, filed Mar. 19, 1982, now abandoned.

TECHNICAL FIELD

The present invention relates generally to a mechanism for engaging an actuating mechanism to an operating device, and more particularly to a split nut type mechanism for engaging a rotary screw actuator.

BACKGROUND ART

In application wherein it is necessary to selectively engage a control mechanism with a manual actuating device, one type of device used in the art is a single split nut device in which a half-nut is moved into engagement with a manually rotated screw to effect manual actuation of the control mechanism. One disadvantage of such a device is that excessive bearing stresses can be applied to the rotating screw, which can result in shearing of the nut threads or disengagement due to stripping of the threads. Also, in the prior art mechanism, nut separation forces act on the operating rod which moves the nut into engagement with the screw. As a result of these forces, the operating rod and the rotating screw must be sized accordingly.

Because of the foregoing, it has become desirable to develop an improved locking mechanism for engaging a rotary screw type actuator.

SUMMARY OF THE INVENTION

The present invention solves the aforementioned problems associated with the prior art as well as other problems by providing a split-nut locking mechanism in which two nut halves are moved simultaneously into engagement with a rotating operating screw. The nut halves are received between spaced frame plates, with one nut half fixed to the plates and the other nut half slidable between the plates. The nut halves are spring-loaded out of engagement with the screw, and are moved into engagement by a cam acting against the movable nut half. The movable nut half is spring-loaded by means of a compression spring acting between an end wall of the frame and a bolt extending through the spring and threaded into the movable nut half, this structure allowing the spring to, in effect, pull the nut halves apart, out of engagement with the permanently located screw under the normal operating condition of the control mechanism or the like to which the locking mechanism is attached.

The nut halves are in surrounding relation to a cross shaft extending perpendicular to the screw, with a central portion of cross shaft being bored out to receive the screw. The cross shaft extends beyond the edges of the frame plates where it can be engaged by a yoke or other means for connection to the mechanism which is to be selectively actuated by rotating the screw.

BRIEF DESCRIPTION OF THE DRAWINGS

FIG. 1 is a perspective view of the invention applied to an operating yoke.

FIG. 2 is a cross-sectional view showing the invention in a disengaged position.

FIG. 3 is a cross-sectional view showing the invention in an engaged position.

FIG. 4 is a perspective view of the actuating assembly of the invention.

DESCRIPTION OF THE PREFERRED EMBODIMENT

Referring now to the drawings where the illustrations are for the purpose of describing the preferred embodiment of the present invention and are not intended to limit the invention hereto. FIGS. 1, 2, and 3 illustrate a locking mechanism 10 which comprises a rotating operating shaft 12, whose axis is fixed a predetermined distance from the fixed axis of actuating shaft assembly 13, a frame assembly 14 in surrounding relation to the shaft 12, a pair of nut halves 16 and 18 within the frame and in surrounding relation to the shaft 12, a spring-loaded actuating assembly 20 operable to move the nut halves into engagement with the operating shaft, and a cross shaft 22 received within the nut halves and extending beyond the frame assembly for engagement with an operating yoke or the like.

The fixed axis operating shaft 12 is usually bearing mounted to a drive mechanism such as a positioner (not shown) and can be any form of threaded shaft which can be rotated either manually or by some convenient power means to effect linear movement of the locking mechanism 10 along the fixed axis operating shaft 12. Referring to FIG. 1, the present invention is illustrated in conjunction with an operating yoke 24 which is attached to a rotating control shaft 26 which in turn can be used to rotate some form of rotary device not important to the present invention. For illustrative purposes, a control arm 28 is shown as part of the operating yoke 24, the arm 28 being connected to an automatic device schematically represented at 30, which is normally used to rotate the control shaft 26.

The frame assembly 14 comprises an upper frame plate 32, a lower frame plate 34, and an outer wall member 36 which separates the upper and lower plates and is fastened thereto by means of screws 38. Holes 39 and 40 are formed in the upper and lower plates respectively, the holes being somewhat larger than the fixed axis shaft 12 to provide clearance for operation of the locking mechanism 10. An inside wall of the frame assembly 14 is defined by one nut half 16, which is also fastened to the frame plates 32 and 34 by means of screws 38. The other nut half 18 is slidingly received between the frame plates 32 and 34.

The nut halves 16 and 18 are compatably threaded on the side facing the threaded shaft 12 and are moved into and out of engagement with the shaft 12 by means of the actuating assembly 20. The actuating assembly 20 comprises two elongated bolts 41 which are threaded into the sliding nut half 18, and extends through a clearance hole provided in the outer wall 36, a compression spring 42 acting between the outer wall and a plate 53 received under the heads of the bolts 41, a cam member 44 received within the frame plates between the outer wall 36 and the sliding nut half 18, and the actuating shaft assembly 13 having a hexagonal operator rod 46 which is received in a hexagonal hole formed through the cam member 44 along the axis thereof and which extends outside the frame assembly through enlarged holes 48 and 50 formed through the upper and lower frame plates 32 and 34 respectively. The axis of the cam member is offset from the bolts 41, and a slot is formed in the cam member to clear the bolts 41. The cam member 44 is essentially elliptical with a minor diameter 51 and a major diameter 52. The spring acts between the outer wall 36 and the plate 53 received under the heads of the bolts 41, and normally maintains the sliding nut half 17 and the frame assembly 14 in the relative position shown in FIG. 2, wherein the nut halves 16 and 18 are out of engagement with the threaded shaft 12, when the cam member 44 is in the position shown in FIG. 2 with the minor diameter 51 between the outer wall 36 and the sliding nut half 18. The operator rod 46 is fixed to the positioner (not shown) and thus remains with its axis a fixed distance from the axis of the shaft 12.

When it is desired to engage the locking mechanism with the shaft 12, the operator rod 46 of the actuating shaft assembly is rotated by means of a handle 47 attached thereto to rotate the cam member 44 to the position shown in FIG. 3, with the major diameter 52 of the cam between the outer wall 36 and the sliding nut half 18. When this is done the sliding nut half 18 is pressed against the shaft 12 by the cam member 44 enlarging the space between the outer wall 36 and the movable nut half 18. The assembly 10 is dimensioned to thus provide engagement of the shaft 12 by both halves of the split nuts 16,18 when the cam 44 is in the FIG. 3 position. In this position, the sliding nut half 18 is in engagement with the shaft 12, while at the same time the force of the cam member 44 against the outer wall 36 has pulled the frame assembly 14 to the left as shown, compressing the spring 42, placing the nut half 16 also into engagement with the shaft 12.

With both nut halves in engagement with the shaft 12, when the shaft is rotated, the entire locking mechanism 10 will move up or down relative to the shaft, depending on the direction of rotation.

In the illustrated embodiment, the locking assembly 10 is connected to the operating yoke 24 by means of the cross shaft 22, the ends thereof extending through the frame assembly with the ends received in slots 54 formed in yoke arms 56. As shown in FIGS. 2 and 3, the cross shaft 22 is received through the nut halves, with an enlarged central portion 58 being received through arcuate channels 60 formed through the nut halves, such that the nut halves act directly on the cross shaft 22 when the nut halves are engaged with the shaft 12 and the shaft is rotated.

To disengage the locking mechanism 10 from the shaft 12, the operating rod 46 is rotated back to the position wherein the cam member 44 is in the position shown in FIG. 2 with the minor diameter of the cam member 44 being between the nut half 18 and the outer wall 36. When the cam member is moved to this position, the spring 42 pulls the sliding nut half 18 out of engagement with the shaft 12, while at the same time the frame assembly 14 is pushed to the right to disengage the nut half 16 from the shaft 12.

The locking mechanism 10 can be used in a variety of applications wherein it is desired to selectively lock onto an operating shaft for intermittent operation of some device. For purposes of illustration, the present invention is shown as applied to the operating yoke 24 of a control device, shown schematically at 62, which is rotated by means of the control shaft 26 of the operating yoke. In normal operation, yoke arm 28 is connected to the automatic operating device shown schematically at 30, for automatic operation of the control device 62. During such normal operation the locking device 10 is in the FIG. 2 position and rides freely up and down the shaft 12. When manual operation of the device 62 is required, the locking device 10 can be engaged with the shaft 12 in any position of the yoke by rotating the operating rod 46 to put the device in the FIG. 3 position in which the nut halves engage the shaft 12. The shaft 12 can then be rotated manually or by some other means to move the yoke with the locking mechanism 10.

Certain modifications and improvements will occur to those skilled in the art upon reading the foregoing. It should be understood that all such modifications and improvements have been deleted herein for the sake of conciseness and readability but are properly within the scope of the following claims.

We claim:

1. An automatic/manual transfer mechanism for an actuator having a rotating control shaft comprising:
   a rotatable threaded shaft afixed to said rotary actuator for manually positioning said control shaft,
   a first nut half received on one side of said threaded shaft,
   a second nut half received on the opposite side of said threaded shaft and aligned with said first nut half, said nut halves being movable between a first position out of engagement with said threaded shaft during automatic operation of said actuator and a second position engaged with said threaded shaft during manual operation of said actuator,
   cam means operable on said nut halves to simultaneously move said nut halves selectively into and out of engagement with said threaded shaft to thereby switch the actuator operation between automatic and manual operation,
   a frame,
   means fixing said first nut half to said frame, said second nut half being slidable along said frame,
   means for moving said control shaft during automatic operation of said actuator,
   an operating yoke connected to said control shaft, and
   a cross shaft received through said nut halves perpendicular to the axis thereof, said cross shaft having a bore formed therethrough receiving said threaded shaft and extending beyond said frame for engagement with said operating yoke thereby allowing said nut halves to follow the movement of said actuator without engaging said threaded shaft and permitting the engagement of said nut halves with said threaded shaft at the last automatic position of said actuator.

2. The apparatus as defined in claim 1, in which said cam member is substantially elliptical in cross section, said first dimension being defined by the minor diameter of said elliptical section, and said second dimension being defined by the major diameter of said elliptical section.

3. The apparatus as defined in claim 2, including means engageable with said cam member and manually operable to move said cam member between a first position corresponding to said first position of said nut halves and a second position corresponding to said second position of said nut halves, 4. The apparatus as defined in claim 1, including spring means acting between said frame and said second nut half, said spring means biasing said nut halves into said first position.

5. The apparatus as defined in claim 1, in which said frame comprises first and second plate members, said first nut half being received between said plate members and attached to one end thereof, and said second nut half being slidably received between said plate members; and an end wall received between said plate members and attached to the opposite end thereof; said cam member comprising a substantially cylindrical member elliptical in cross section received between said plate members and between said end wall and said second nut half and rotatably about an axis parallel to the axis of said nut halves.

6. The apparatus as defined in claim 5, including spring means acting between said end wall and said second nut half biasing said nut halves into said first position.

7. The apparatus as defined in claim 6, wherein said spring means comprises a pair of elongated bolts threaded into said second nut half and extending through said end wall; a plate received under the heads of said bolts; and a compression spring having one end received against said end wall and the other end received against said plate.

8. The apparatus as defined in claim 1, wherein said cam means includes a cam member received between said second nut half and a portion of said frame and having a first dimension between said second nut half and said frame portion when said nut halves are in said first position and a second dimension between said second nut half and said frame portion when said nut halves are in said second position.

* * * * *